United States Patent [19]

Pinon et al.

[11] Patent Number: 5,045,193

[45] Date of Patent: Sep. 3, 1991

[54] DEVICE FOR DETECTION, ANALYSIS, IDENTIFICATION AND CHARACTERIZATION BY FILTRATION AND IMMUNOFILTRATION

[75] Inventors: Jean-Michel Pinon, Reims; Andre Brandel, Epernay Cedex, both of France

[73] Assignee: Hopital Maison Blanche, Reims, France

[21] Appl. No.: 445,111

[22] Filed: Nov. 30, 1989

Related U.S. Application Data

[63] Continuation of Ser. No. 199,037, Jul. 14, 1988, abandoned.

[30] Foreign Application Priority Data

Sep. 15, 1986 [FR] France ................................. 8612960

[51] Int. Cl.⁵ .......................................... B01D 35/143
[52] U.S. Cl. .............................. 210/232; 210/321.84; 210/445; 210/450; 210/489; 210/498
[58] Field of Search ............... 210/321.69, 198.2, 232, 210/321.84, 247, 445, 446, 450, 484, 488, 492, 489, 498, 772; 604/406; 422/101; 424/DIG. 7; 436/177, 178; 403/252; 285/351

[56] References Cited

U.S. PATENT DOCUMENTS

| | | | |
|---|---|---|---|
| 2,813,632 | 11/1957 | Muller ................................. | 210/498 |
| 3,700,111 | 10/1972 | Bode .................................. | 210/488 |
| 4,056,100 | 11/1977 | Noiles ................................. | 210/446 |
| 4,084,718 | 4/1978 | Wadsworth ....................... | 210/198.2 |
| 4,126,559 | 11/1978 | Cooper ............................... | 210/445 |
| 4,225,440 | 9/1980 | Pitesky ............................... | 210/445 |
| 4,252,213 | 5/1966 | Cuta ................................... | 210/445 |
| 4,301,010 | 11/1981 | Eddleman et al. ................... | 422/101 |
| 4,361,483 | 11/1982 | Pall .................................... | 210/446 |
| 4,426,295 | 1/1984 | Evans et al. ........................ | 210/772 |
| 4,623,461 | 11/1986 | Hossom et al. ..................... | 422/101 |
| 4,632,434 | 12/1986 | Proctor et al. ..................... | 285/351 |
| 4,690,757 | 9/1987 | Mathus et al. ..................... | 210/446 |
| 4,710,289 | 12/1987 | Wermuth et al. ................. | 210/198.2 |
| 4,732,687 | 3/1988 | Muller et al. ..................... | 210/198.2 |
| 4,767,602 | 8/1988 | Johnson ............................. | 422/101 |
| 4,769,145 | 9/1988 | Nakajima ........................... | 210/445 |
| 4,777,137 | 10/1988 | Lemonnier ..................... | 210/321.84 |
| 4,787,769 | 11/1988 | Michael ............................. | 403/252 |

FOREIGN PATENT DOCUMENTS

| | | | |
|---|---|---|---|
| 2717047 | 10/1978 | Fed. Rep. of Germany ...... | 210/445 |
| 2912173 | 10/1979 | Fed. Rep. of Germany ........ | 210/94 |
| 2818494 | 11/1979 | Fed. Rep. of Germany ........ | 210/321.84 |
| 1317224 | 1/1963 | France ................................ | 210/348 |
| 2093894 | 1/1972 | France ................................ | 210/348 |
| 2452294 | 10/1980 | France ................................ | 210/348 |
| 4048382 | 4/1979 | Japan ................................. | 210/484 |
| 59-16502 | 1/1984 | Japan ............................... | 210/198.2 |
| 1311757 | 5/1987 | Japan ................................ | 210/348 |
| 654666 | 2/1986 | Switzerland ................... | 210/198.2 |
| 868586 | 9/1981 | U.S.S.R. ......................... | 210/198.2 |
| 1349564 | 4/1974 | United Kingdom ............... | 210/445 |
| 1489067 | 10/1977 | United Kingdom ............... | 210/445 |

OTHER PUBLICATIONS

International Application WO8606978, Hossom et al., "Transverse Flow Diagnostic Device", 12-1986.
J. M. Pinon, H. Thoannes and N. Gruson—An Enzyme-Linked Immuno-Filtration Assay Used to Compare Infant and Maternal Antibody Profiles in Toxoplasmosis—Journal of Immunological Methods, 10/22/84, p. 17.
Pinon, J. M. et al., "An Enzyme-Linked Immuno-Filtration Assay Used to Compare Infant and Maternal Antibody Profiles in Toxoplasmosis", Journal of Immunological Methods, pp. 15-23, (1985).

*Primary Examiner*—Robert A. Dawson
*Assistant Examiner*—Joseph Drodge
*Attorney, Agent, or Firm*—Cushman, Darby & Cushman

[57] ABSTRACT

A device and method for detecting and quantifying a substance by filtration. The device includes a body having two parts (1 and 2) nested into each other. One of the parts (1) is used as a reservoir and the other part (2) is used as a filter-holder and as a receptacle. The device further includes a retention and reaction system including a strut (3), two multi-pierced or perforated plates (4 and 5) which encase a filtering member and a thin strut. A seal is further provided between the two parts. The reservoir and the receptacle are connected to an external circuit by means of conduits, mouthpieces and pipes. The interlocking of the two parts is achieved by means of jointed hooks.

5 Claims, 2 Drawing Sheets

DEVICE FOR DETECTION, ANALYSIS, IDENTIFICATION AND CHARACTERIZATION BY FILTRATION AND IMMUNOFILTRATION

This is a continuation of application Ser. No. 07/199,037, filed July 14, 1988, which was abandoned upon the filing hereof.

BACKGROUND OF THE INVENTION

1. Field of the Invention

The invention relates to a device for detecting, analyzing, identifying and characterizing by filtration and immunofiltration.

2. Description of the Related Art

The conventional means for detecting and quantifying typically employ overall quantitative techniques and procedures whether in industry or in the medical field.

In industry, for example, the degree of contamination or pollution of a fluid, especially fluids employed in hydraulic servo-control systems, is assessed by counting the solid particles of varying sizes retained by a filtering membrane having particular characteristics and dimensions. The particles are counted under a microscope utilizing a fixed grid. As is apparent, however, with this method it is not possible to detect chemical contaminants nor to determine bacteriological contamination which, nevertheless, are factors that are sometimes more important than particulate contamination or pollution.

In the medical field, a similar process is used to determine and/or quantify the presence of substance in swabs so as to facilitate diagnosis and to determine appropriate treatment or prepare a reagent. However, such processes have not been used in many areas of biomedical analysis and other methods have been preferred despite the constraints and inaccuracies thereof.

SUMMARY OF THE INVENTION

It is an object of the present invention to provide a device which is capable of broadening the field of application of detection or immunodetection and quantification by filtration or immunofiltration. Therefore, it is an object of the invention to provide a device and process whereby sufficiently accurate results can be obtained simply and quickly.

The foregoing and other objects are realized in accordance with the present invention by provided a device including a body having two parts nested into each other, the first part being used as a reservoir and the other part being used as a filter holder and receptacle, and a particular system of retention and reaction. More particularly, the system of retention and reaction includes a relatively thick spacer or washer (hereafter thick washer), two multi-pierced or perforated plates which encase a reaction support and a thin spacer or washer (hereafter thin washer) and form a filtering chamber which opposes any deformation of the reaction support. Conduits, mouthpieces, hoses and the like are provided for fluidly coupling the reservoir and receptacle to an external circuit. The two parts of the body are interlocked and the retention and reaction system is compressed by means of hooks for joining the parts together.

The base of the first part includes a recess defining the reservoir. The thick washer and the thin washer are each provided with a cut-out of the same dimensions as those of the recess provided in the base of the first part. The parts of the device ae coupled to one another via a stud, fastened radially in the base of the first part and a groove provided in the other part so as to prevent any rotation and to facilitate positioning.

The device having the characteristics and components noted above is utilized as follows: a fluid flow in one direction or the other is provided through the reaction support. The receptacle is then subjected to positive or negative pressure so as to obtain or regulate the flow of fluid in one direction or the other through the reaction support, until the free space defined under the support by the washer is completely full. The thickness of the washer is determined as a function of the volume of the chamber to be defined thereby.

With the foregoing structure, then, fluid flow through the device is such that contact between the fluid and the reaction support is maximized. The speed of flow of fluid through the reaction support can be modulated during operation, the fluid flow being either continuous, intermittent with timed recycling op sequential reversal of flow.

The body, thick washer, thin washer and flexible seal gasket (hereafter gasket) are preferably made from a transparent material so as to enable monitoring of the filtration process.

Other features and advantages of the present invention will become apparent upon consideration of the following detailed description with reference to the accompanying drawings, and the appended claims which are presented way f example only.

BRIEF DESCRIPTION OF THE DRAWINGS

FIG . 1 is a front cross-sectional view of a device provided in accordance with the present invention.

DETAILED DESCRIPTION OF THE PRESENTLY

PREFERRED EXEMPLARY EMBODIMENT

Figure 1:
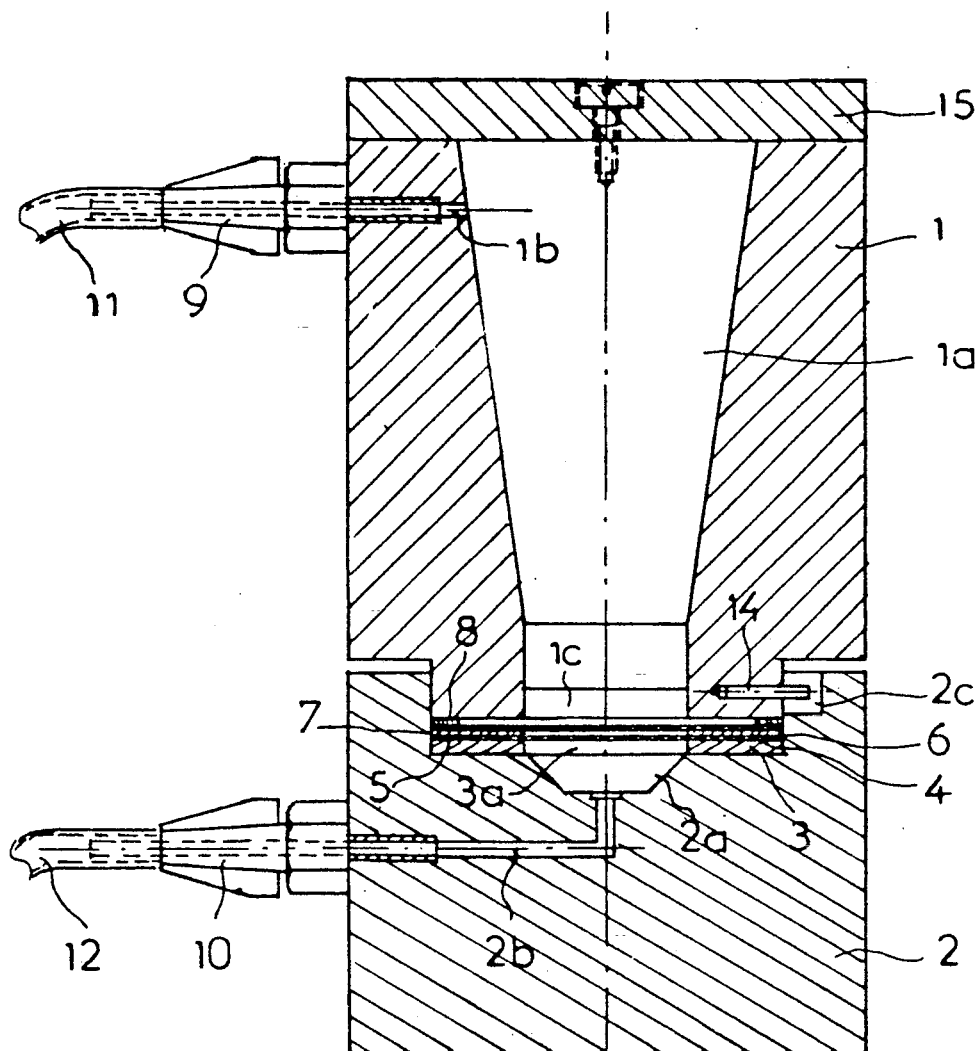
Figure 2:
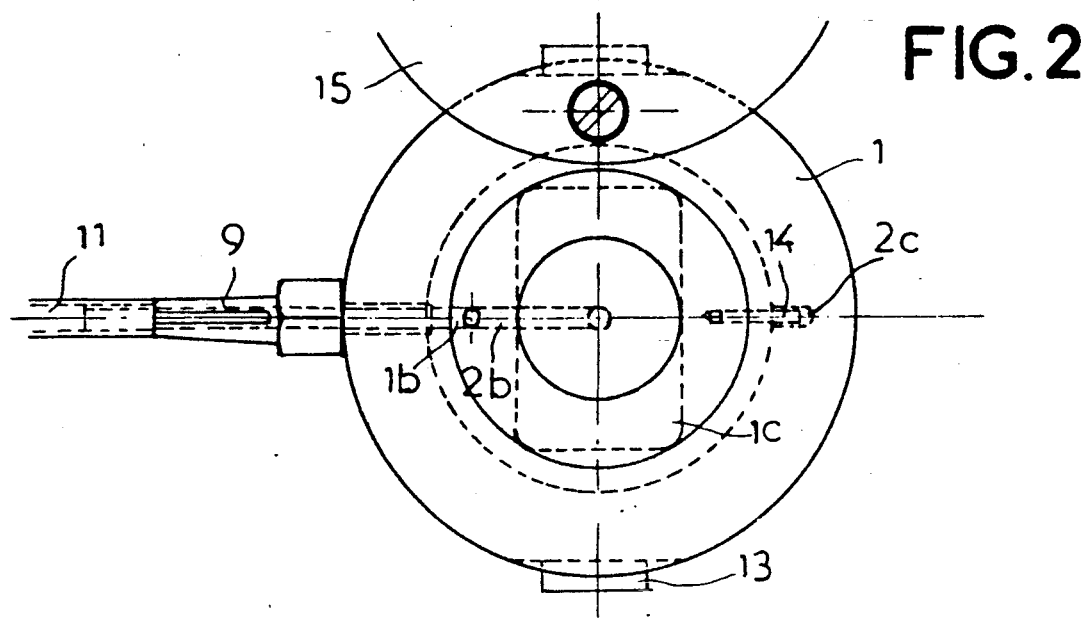
FIG. 2 is a top plan view of the device of the invention.
Figure 3:
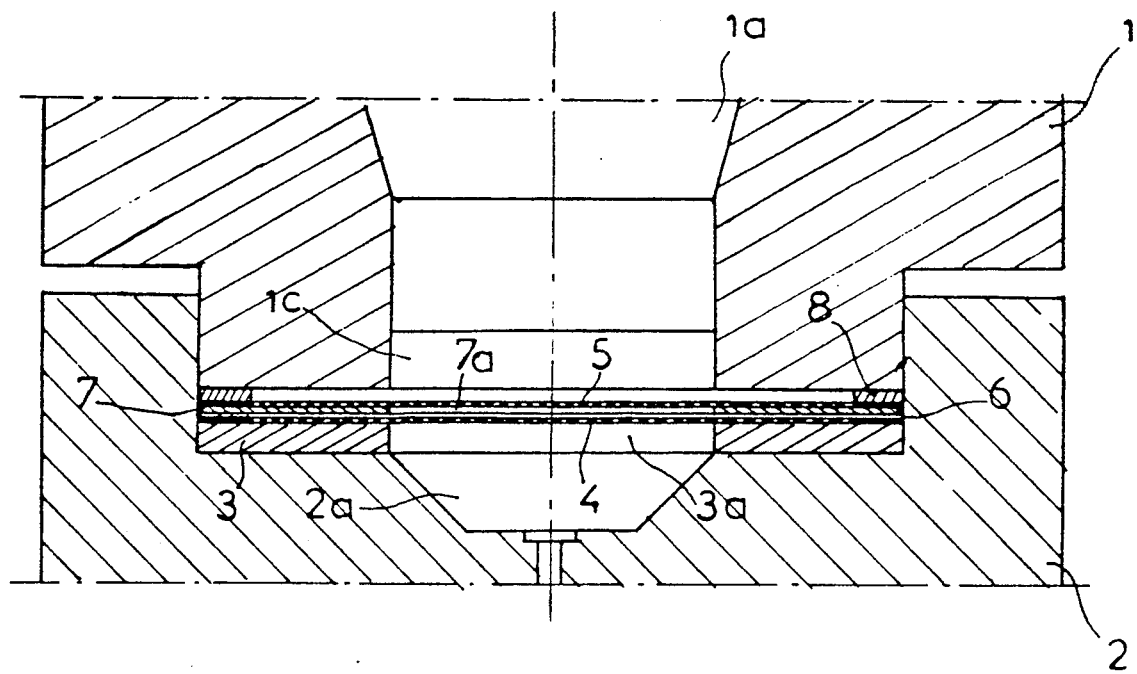
FIG. 3 is a partial cross-sectional view of the device of the invention at the level of the reaction support.

With reference to FIGS. 1, 2 and 3, it can be seen that the upper part 1 of the body of the cell nests in lower part 2, imprisoning or caging the reaction system. The reaction system includes a washer 3 with rectangular cut-out 3a, a rigid perforated plate 4 which supports a filtering membrane 6 of cellulose acetate, nitrocellulose, or equivalent material, a thin washer 7 with a cut-out 7a, and a second rigid perforated plate 5 which overlays the thin washer 7. Finally, a gasket 8 is provided on top of the second perforated plate 5 to make the cell fluid tight.

The upper part 1 includes a truncated cone reservoir 1a which emerges in the rectangular recess 1c having an opening located just above perforated plate 5. Reservoir 1a is connected to an external circuit by a conduit 1b, mouthpiece 9 and pipe 11. Reservoir 1a is blocked off by a pivoting lid 15.

The lower part 2 contains receptacle 2a which is connected to an external circuit by a conduit 2b, mouthpiece 10 and a pipe 12.

Parts 1 and 2 of the body of the cell in the vicinity of recess 1c and cutouts 3a and 7a are secured together by lug 14 and groove 2c so that relative rotation of the parts is prevented.

Figure 4:
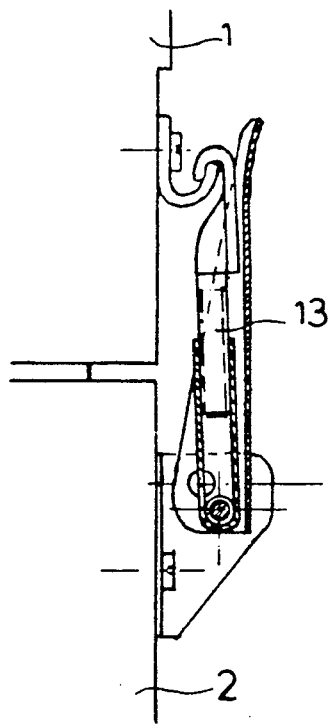
FIG. 4 is a partial cross-sectional view of the device at the level of the hooks connecting the two parts of the body together.

As shown in FIG. 4, the cell is sealed with the retention and reaction system and gasket 8 gripped between the two parts of the body under the action of a fast actuating joining hook 13.

Flow of fluids containing, for example, the substance to be revealed or the substance used for detection on the membrane, can be effected by applying a negative pressure in receptacle 2a. A quantity of fluid which is determined as a function of the reaction requirements, the thickness of washer 3 and the dimensions of cut-out 3a, enters into contact with the cellulose acetate membrane for the time required to obtain the reaction. Because membrane 6 is in facing relation to the lower perforated plate 4, it cannot be damaged as a result of the negative pressure and fluid flow through the cell. Furthermore, the membrane will not blister under the action of the fluid because the upper perforated plate 5 is provided.

In accordance with the structure of the invention, then, only a portion of the surface of the membrane is exposed to fluid flow and comes into contact with it.

The device of the invention can be utilized in biological, chemical, and industrial fields. In the medical field, it can be used in immuno-electro diffusion, immunofiltration and immuno-detection. It can also be used for the transfer of products or substances determined or to be determined from a semi liquid or equivalent medium in an absorbent nitrocellulose type or equivalent material and for the detection of substances in solution by filtration on nitrocellulose or equivalent material and for the detection of substances in solution by filtration on nitrocellulose or equivalent and to characterize the substance that is captured by immunofiltration with clearly defined markers. The device of the invention can also be miniaturized and be used on a bandage reaction support. Further, the membranes can be utilized in bio-reactive diagnosis or could be intregated into an automated system. Finally, the cell could be used in the absence of gravity because a positive or negative pressure is applied to the fluid flowing therethrough.

We claim:

1. A device for detecting, analyzing, identifying and characterizing a substance by filtration and immunofiltration comprising:

a body comprising first and second parts coupled so that a second end of the first part is inserted into a first end of the second part, each of said parts having a flow path defined therethrough so that when said parts are coupled together, a flow path is defined through the body, one of said parts defining a reservoir and the other part defining a filter-holder;

a retention and reaction system mounted between said first and second parts, said retention and reaction system including, in the order recited, a first perforated plate, a filtering membrane, a first washer, and a second perforated plate, said retention and reaction system being disposed so that said flow path intersects a plane of each of said first perforated plate, said filtering membrane, said first washer, and said second perforated plate; and gasket means mounted between said one of said parts and said retention and reaction system, said gasket being disposed in surrounding relation to said flow path; and a second washer mounted between said retention and reaction system and said other part, said second washer being disposed in surrounding relation to said flow path.

2. A device as claimed in claim 1, wherein said one part includes a rectangular recess defining an outlet of said reservoir.

3. A device as claimed in claim 2, wherein a cut-out is defined in each of said washers, said cut-outs having dimensions substantially equal to the dimensions of said rectangular recess.

4. A device as is claimed in claim 1, wherein a stud extends parts and a groove is defined in the other of said parts, said stud being disposed in said groove when said first and second parts are coupled together whereby relative rotation of said first and second parts is prevented.

5. A device as claimed in claim 1, wherein the second washer has a thickness determined as a function of a volume of a chamber to be defined thereby.

* * * * *

UNITED STATES PATENT AND TRADEMARK OFFICE
CERTIFICATE OF CORRECTION

PATENT NO. : 5,045,193

DATED : September 3, 1991

INVENTOR(S) : PINON, et al.

It is certified that error appears in the above-identified patent and that said Letters Patent is hereby corrected as shown below:

Title Page should read:

[73] Assignee: Jean-Michel PINON, Reims, France

Signed and Sealed this

Twenty-ninth Day of March, 1994

Attest:

BRUCE LEHMAN

Attesting Officer

Commissioner of Patents and Trademarks